(12) United States Patent
Sevar

(10) Patent No.: US 8,855,946 B2
(45) Date of Patent: Oct. 7, 2014

(54) METHOD FOR AVOIDING JUMP FAULTY MEASUREMENTS AND IMPROVING ACCURACY IN HYBRID FLOW METERS

(75) Inventor: Jean-Marie Sevar, Welkenraedt (BE)

(73) Assignee: Flow-Tronic S.A., Welkenraedt (BE)

( * ) Notice: Subject to any disclaimer, the term of this patent is extended or adjusted under 35 U.S.C. 154(b) by 291 days.

(21) Appl. No.: 13/005,352

(22) Filed: Jan. 12, 2011

(65) Prior Publication Data

US 2011/0178735 A1  Jul. 21, 2011

Related U.S. Application Data

(60) Provisional application No. 61/295,904, filed on Jan. 18, 2010.

(51) Int. Cl.
*G01F 7/00* (2006.01)
*G01F 25/00* (2006.01)
*G01D 3/08* (2006.01)
*G01F 1/00* (2006.01)

(52) U.S. Cl.
CPC .. *G01F 1/00* (2013.01); *G01F 7/00* (2013.01); *G01D 3/08* (2013.01); *G01F 25/00* (2013.01)
USPC ............................... 702/45; 702/100; 73/197

(58) Field of Classification Search
CPC ............. G01F 1/00; G01F 7/00; G01F 25/00; G01D 3/08
USPC ...................... 702/45, 100; 73/197
See application file for complete search history.

(56) References Cited

U.S. PATENT DOCUMENTS

| | | | | |
|---|---|---|---|---|
| 5,315,880 A | * | 5/1994 | Bailey | 73/861.25 |
| 5,821,427 A | * | 10/1998 | Byrd | 73/861.25 |
| 5,861,556 A | * | 1/1999 | Nukui et al. | 73/204.17 |
| 6,047,244 A | * | 4/2000 | Rud, Jr. | 702/98 |
| 2003/0167836 A1 | * | 9/2003 | Mattar | 73/197 |
| 2006/0016243 A1 | * | 1/2006 | Nevius | 73/1.16 |
| 2007/0220995 A1 | * | 9/2007 | Kishiro et al. | 73/861.28 |
| 2008/0270046 A1 | | 10/2008 | Borenstein | |

FOREIGN PATENT DOCUMENTS

DE  41 04 451 A1   8/1992
EP  1 978 335 A1   10/2008

OTHER PUBLICATIONS

Machine Translation of DE 41 04 451, Aug. 27, 1992.*
European Search Report mailed on Aug. 12, 2010 for corresponding European application No. EP 10 15 6165.

* cited by examiner

*Primary Examiner* — Jonathan C Teixeira Moffat
*Assistant Examiner* — Liam R Casey
(74) *Attorney, Agent, or Firm* — Merchant & Gould P.C.

(57) ABSTRACT

A method measures a hybrid flow rate (Q) of a fluid using simultaneously at least two measuring technologies and a reference measurement, the method includes a hybrid value, wherein the measurements of the at least two measuring technologies are combined according to a given rule to get the hybrid value by performing a linear or non-linear interpolation within a given interval of the reference measurement.

16 Claims, 5 Drawing Sheets

METHOD FOR AVOIDING JUMP FAULTY MEASUREMENTS AND IMPROVING ACCURACY IN HYBRID FLOW METERS

CROSS-REFERENCE TO RELATED APPLICATIONS

This application claims the benefit of Ser. No. 61/295,904, filed Jan. 18, 2010 in the United States and which application is incorporated herein by reference. A claim of priority to which, to the extent appropriate, is made.

BACKGROUND OF THE INVENTION

1. Field of the Invention

The present invention relates to the field of flow meters. In particular, the present invention relates to a method in hybrid flow meters.

2. State of the Art

Flow meters are using different technologies to measure the flow rate. Most flow meters do not measure the flow rate directly, but measure the velocity which is multiplied by the cross-sectional area to calculate the flow rate. In open channel flow measurements, some technologies measure the level and convert the level into flow rate using empirical equations such as the Manning equation, or convert the level into flow rate using mathematical equations when flumes or weirs are used. Other open channel technologies are using the continuity equation Q=A*V (flow rate Q equals area A multiplied by average velocity V). The level is measured and associated with the channel shape to calculate the wet area. The local velocity is measured using different technologies and converted to the average velocity of the wet cross-sectional area.

Depending on the application, one specific technology has advantages or disadvantages compared with the other. Not only the application, but the broad range of flow conditions, types of fluid or concentration of different materials present in the fluids to be measured, have different impact on the accuracy and measurement results depending on the measurement technology used.

Rain, storm and waste water channels, natural streams and man-made channels are mostly exposed to consistently changing conditions, i.e. low flows, high flows, surcharge flow conditions, reverse flow, stagnation and non-uniform velocity distribution profiles, as well as continuous variation of the fluid nature.

Current flow measurement technologies are only accurate within a prescribed range of conditions. If the condition changes, the stated or nominal accuracy of these flow meters is no longer valid. As an example, we can take the flume or weir with level meter which needs free discharge of water flow to stay within its +/−5% stated accuracy. This stated accuracy is totally lost once the primary device (flume or weir) is totally or partially submerged.

The submerged velocity/level sensors such as Doppler-pressure and EM-pressure sensor combinations have problems due to the built-up of silt, fouling sensors, catching debris, non uniform velocity distribution and variation of particle concentration. Additionally, low or dry day flow conditions will present measurement problems especially for pulsed cross-correlation or time-gated Doppler sensors due to the dead band, resulting in an amount of fluid level above the sensor in which no velocity measurement can be taken.

Surface detecting radar flow measuring devices solve the maintenance problem of fouled sensors and minimum fluid level to measure the velocity, but cannot measure during submerged flow conditions, when the radar velocity sensor is submerged, as an air to water interface is required for radar Doppler velocity sensors. Those flow meters also lose signal at velocities under 0.1 to 0.2 m/s.

In order to overcome these problems so-called "hybrid technology" flow meters have been designed. They use one technology, which in some cases is also referred to as the master technology, before they switch over to a different or secondary technology at the crossover point.

Some hybrid systems switching over from one measuring technology to another are using hysteresis at the crossover point to avoid constant back and forth jumping.

Present hybrid flow meters, switching from one technology to the other at a crossover point, are suffering from jumps on the flow output, because the technologies are different and, consequently, the flow measurement results under the same hydraulic flow conditions are different. Such jumps result in control and regulation problems in the downstream equipments (inappropriate control and regulation such as faulty valve positioning, inappropriate closing or opening of valves, incorrect pump control, etc.).

In order to avoid those jumps, one existing technology calibrates the secondary technology based on the readings from the master technology. This technique is experiencing accuracy problems under different specific flow situations, as the master technology might already be at its limits and, consequently, inaccurate when calibrating the slave technology.

OBJECTS OF THE INVENTION

The present invention aims to provide a solution that does not have the drawbacks of the prior art.

The present invention particularly aims at providing a method of flow measurements avoiding the jumps in the flow measurement when switching from one technology to another, and improving the measurement accuracy and performance.

SUMMARY OF THE INVENTION

The present invention relates to a method to measure a hybrid flow rate (Q) of a fluid using simultaneously at least two measuring technologies and a reference measurement, said method comprising a step of calculation of a hybrid value, wherein the measurements of the at least two measuring technologies are combined according to a given rule to get said hybrid value by performing a linear or non-linear interpolation within a given interval of the reference measurement.

According to particular preferred embodiments, the invention further discloses at least one or a suitable combination of the following features:
- the reference measurement is a measurement performed by one of said at least two measuring technologies, a measurement performed by an additional measuring technology, a plurality of additional measurements combined into one reference measurement or any quality parameter value associated with any of those measurements;
- the reference measurement is a flow rate, a point velocity, an average velocity, a level, a differential pressure, a pH, a conductivity, a temperature or a turbidity of the fluid;
- the reference measurement is a signal over noise ratio (SNR), a number of valid measurements taken during the sample time (NVM), an automatic gain control value (AGC), a peak over mean ratio from measurement values during the sample time (PMR) or a number of samples taken during the sample time (NOS);

the measuring technologies measure a flow rate and the hybrid value is the hybrid flow rate (Q) of the fluid;

the measuring technologies measure a velocity of the fluid and the hybrid value is a hybrid velocity (V) of the fluid;

the measuring technologies measure a level of the fluid and the hybrid value is a hybrid level of the fluid;

the measuring technologies measure a level and a velocity of the fluid and the hybrid value is made up of two values which are a hybrid level of the fluid and a hybrid velocity (V) of the fluid;

the hybrid velocity (V) of the fluid is multiplied by a cross-sectional wet area (A) according to the continuity equation Q=A*V to obtain the hybrid flow rate (Q);

the hybrid level of the fluid is used to calculate a cross-sectional wet area (A), said area being multiplied by a measured velocity (V) or a calculated average velocity (V) according to the continuity equation Q=A*V to obtain the hybrid flow rate (Q), said velocity being measured with an additional measuring technology and converted to the average velocity (V) of the cross-sectional wet area (A);

the hybrid level of the fluid is used to calculate a cross-sectional wet area (A), said area being multiplied by the hybrid velocity (V) according to the continuity equation Q=A*V to obtain the hybrid flow rate (Q);

the interval comprises a lower endpoint (A2) and an upper endpoint (B1);

the interval comprises a lower endpoint (A2), an upper endpoint (B1) and intermediate points (X1, . . . , Xn) between endpoints;

the interpolation is performed between the endpoints (A2, B1) of the interval;

the interpolation is performed between the lower endpoint (A2), the intermediate points (X1, . . . , Xn) and the upper endpoint (B1);

the non-linear interpolation is based on a mathematical equation.

BRIEF DESCRIPTION OF THE DRAWINGS

In FIGS. 1 to 5, points A1 and B2 correspond respectively to 0 and 100% of the reference measurement. Points A2 and B1 correspond respectively to the lower and upper endpoints of the interval of integration of both technologies. Points X1, X2, . . . , Xn correspond respectively to intermediate points between the endpoints of the interval.

FIG. 1 shows an example of linear transition from 100% flow meter 1 and 0% flow meter 2 to 100% flow meter 2 and 0% flow meter 1, within the interval between 20% (point A2) and 60% (point B1) of the reference measurement input, according to the method of the invention.

FIG. 2 shows an example of a non-linear transition from 100% flow meter 1 and 0% flow meter 2 to 100% flow meter 2 and 0% flow meter 1, within the interval between 10% (point A2) and 80% (point B1) of the reference measurement input, according to the method of the invention.

FIG. 3 shows an example of a non-linear transition from 80% flow meter 1 and 20% flow meter 2 to 100% flow meter 2 and 0% flow meter 1, within the interval between 20% (point A2) and 80% (point B1) of the reference measurement input, according to the method of the invention.

FIG. 4 shows an example of a non-linear transition from 100% flow meter 1 and 0% flow meter 2 to 80% flow meter 2 and 20% flow meter 1, within the interval between 0% (point A1=point A2) and 100% (point B2=point B1) of the reference measurement input, according to the method of the invention.

Figure 5:
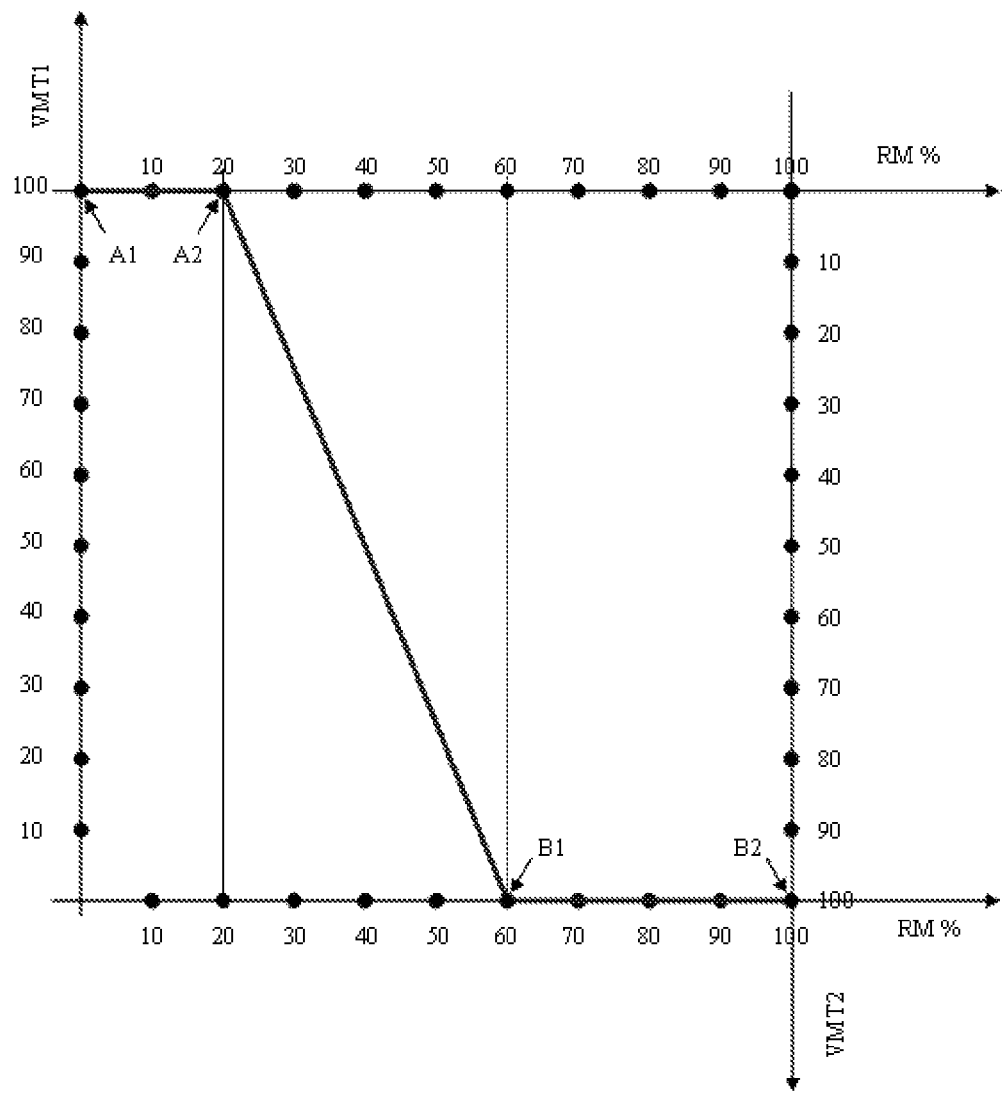
In FIG. 5, the two y-axes refer to the velocity meter technologies (VTM1 and 2), expressed in percentage, and the x-axis to the reference measurement (RM) also expressed in percentage.

The FIG. 5 shows an example of a linear transition from 100% velocity meter 1 and 0% velocity meter 2 to 100% velocity meter 2 and 0% velocity meter 1, within the interval between 20% (point A2) and 80% (point B1) of the reference measurement input, according to the method of the invention.

DETAILED DESCRIPTION OF SEVERAL EMBODIMENTS OF THE INVENTION

The method of flow measurement according to the invention uses at least two measuring technologies and comprises a step wherein the measurements obtained with both (or more) technologies are integrated (the term combined will be also used) to give a so-called hybrid value. This new method uses a reference measurement as input and the integration of both technologies is carried out within a given interval of this reference measurement. The integration consists in a linear or non-linear interpolation between the lower endpoint, the intermediate points (if they are some) and the upper endpoint of the interval.

According to the invention, the measuring technologies refer to all technologies available for measuring the flow rates, including the technologies measuring the level or the velocity or the level/velocity combination of the fluid and converting those measurements in a flow rate. The expression measured flow rate can thus refer to a flow rate calculated on the basis of a measured parameter (level, velocity, . . . ).

According to the invention, the reference measurement can be the measurement of a measuring technology (e.g. the flow rate measured by a master flow meter), a third additional reference measurement, or many additional measurements combined into one reference measurement. In more detail, the reference measurement can be the flow measurement from any flow measuring device, or any primary measurement used to calculate the flow rate, like point velocity, average velocity, level, differential pressure, etc., or any quality parameters associated to any of those measurements, such as SNR (Signal over Noise Ratio), NVM (Number of Valid Measurements during the sample time), AGC (Automatic Gain Control value), PMR (Peak over Mean Ratio from measurement values during the sample time), NOS (Number Of Samples during the sample time), etc., or any additional external reference measurement. Typically, in an open channel hybrid flow meter application using two measuring technologies, a third measurement, used for a flow rate calculation or not, will be taken as reference to make the transition. This third measurement would usually be the liquid level measurement, but could be a different measured input such as pH, conductivity, temperature, turbidity, etc.

This new method integrating the measurements of several technologies within an interval of a reference measurement allows a smooth, smart, progressive linear or non-linear transition from one technology to the other. The interval of interpolation can be large or narrow depending on the technology used, fluid conditions, velocity distribution in the cross-sectional area, etc. As will be shown hereinafter (in FIG. 4), it can even cover the full range of the reference measurement from 0 to 100% which, as an example, can correspond from 0 mm level to maximum level range of the liquid.

The aspects and advantages of this invention will become more clear with the following examples.

By way of examples, the present invention is illustrated in FIGS. 1 to 5 for the integration of two technologies into one hybrid technology. However, a method using 3 or more technologies can also be implemented according to the invention. The hybrid value can be a hybrid flow rate directly calculated from the flow rate measurements or it can be a value (hybrid level, hybrid velocity, etc.) calculated from the level, velocity, etc. measurements and then converted in a hybrid flow rate. In the examples illustrated below, the interpolation within the interval is performed on the basis of the flow rate measurements (FIGS. 1 to 4) or on the basis of the velocity measurements (FIG. 5).

Figure 1:
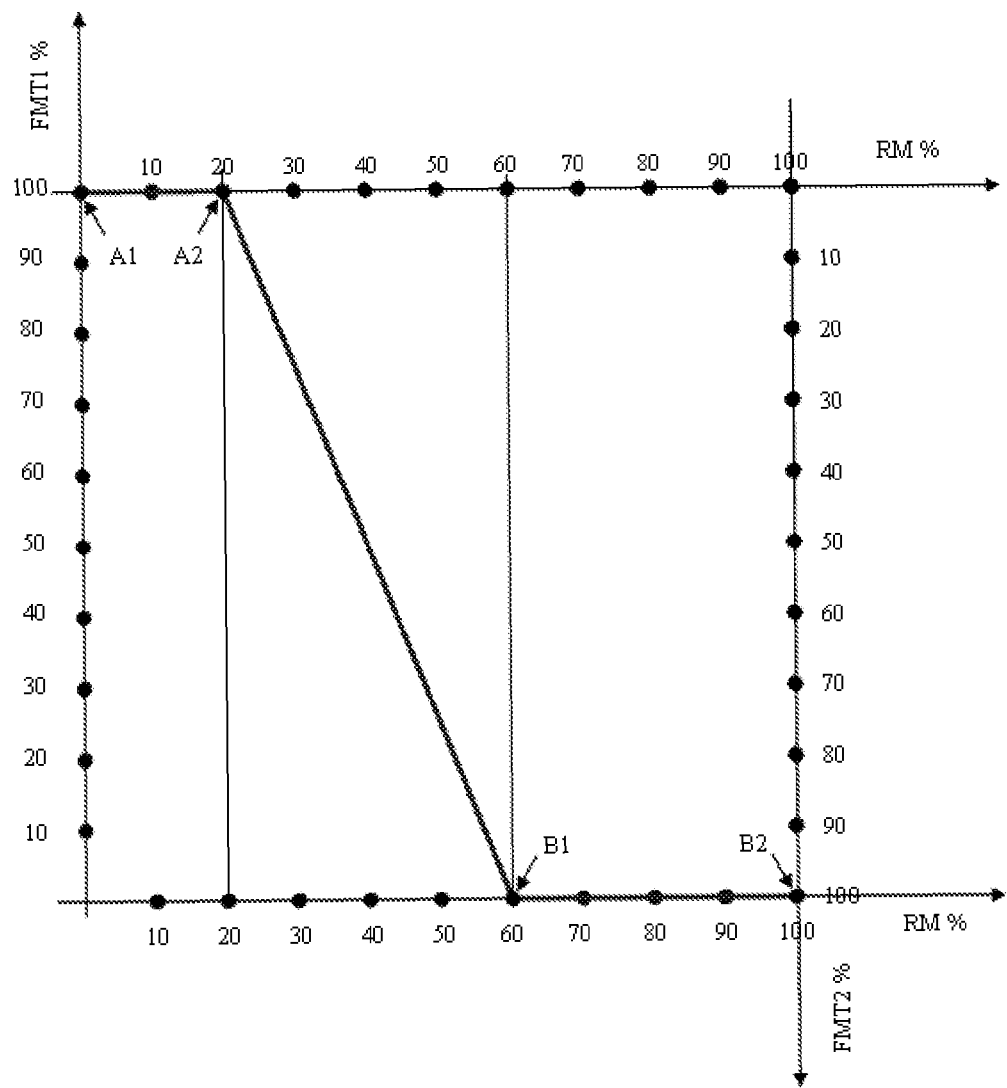
In FIGS. 1 to 4, the two y-axes refer to the flow meter technologies (FMT1 and 2), expressed in percentage. These can be any technologies available for measuring the flow rates. The x-axis refers to the reference measurement (RM), expressed in percentage.

FIG. 1 shows an example of linear transition from 100% flow meter 1 and 0% flow meter 2 to 100% flow meter 2 and 0% flow meter 1, within the interval between 20% (point A2) and 60% (point B1) of the reference measurement input. Practically, the reference measurement can be the liquid level measurement from flow meter 1 within a range of 0 m (0%) to 2 m (100%). 100% of the flow rate from flow meter 1 and 0% of the flow rate from flow meter 2 are taken into account as long as the level reference measurement is between points A1 (0 m or 0%) and A2 (0.4 m or 20%). Between points A2 (0.4 m or 20%) and B1 (1.2 m or 60%), a linear interpolation from 100% of the flow rate from flow meter 1 and 0% of the flow rate from flow meter 2 at point A2 to 0% of the flow rate from flow meter 1 and 100% of the flow rate from flow meter 2 at point B1 is made. This gives as intermediate hybrid flow rate results: at 30% (0.6 m) of the reference measurement, 75% of the flow rate from flow meter 1 and 25% of flow rate from flow meter 2; at 40% (0.8 m) of the reference measurement, 50% of the flow rate from flow meter 1 and 50% of the flow rate from flow meter 2; at 50% (1 m) reference measurement, 25% of the flow rate from flow meter 1 and 75% of the flow rate from flow meter 2. Between points B1 (1.2 m or 60%) and B2 (2 m or 100%) of the reference measurement, 0% of the flow rate from flow meter 1 and 100% of flow rate from flow meter 2 are taken into account.

Figure 2:
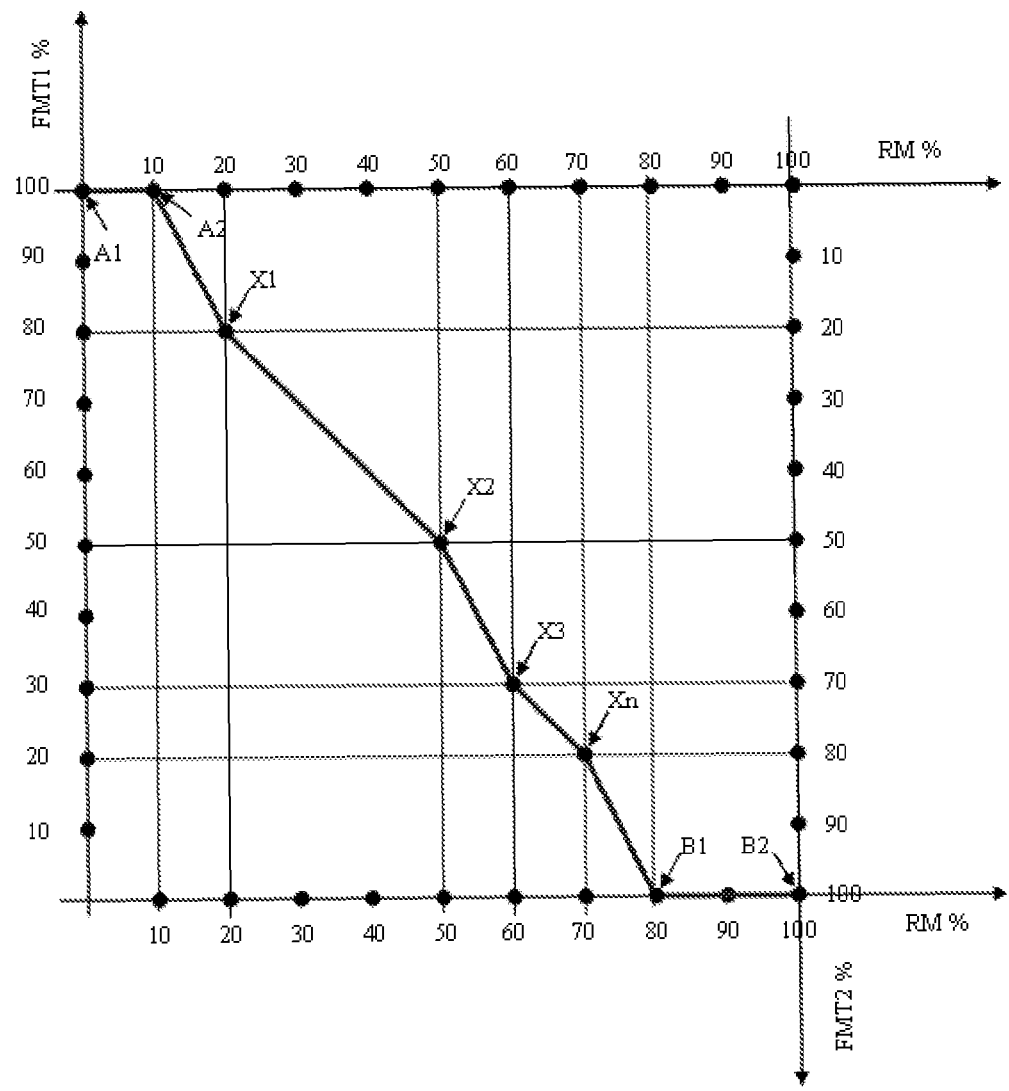

FIG. 2 shows an example of a non-linear transition from 100% of the flow rate from flow meter 1 and 0% of the flow rate from flow meter 2 to 100% of the flow rate from flow meter 2 and 0% of the flow rate from flow meter 1, within the interval between 10% (point A2) and 80% (point B1) of the reference measurement input. A linear interpolation is made to calculate the hybrid flow rate from flow meter 1 and flow meter 2 between the intermediate reference points A2-X1, X1-X2, X2-X3, X3-Xn, Xn-B1.

Figure 3:
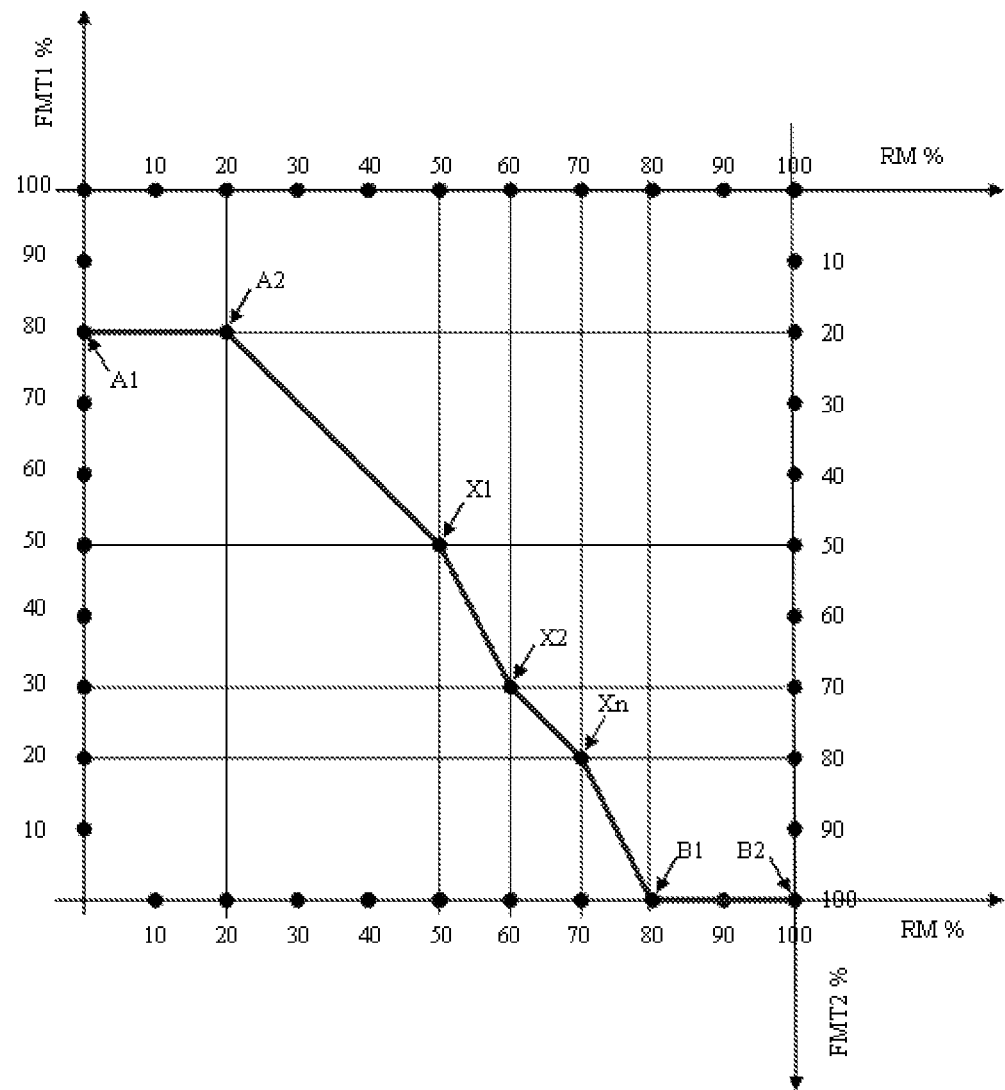

FIG. 3 shows an example of a non-linear transition from 80% of the flow rate from flow meter 1 and 20% of the flow rate from flow meter 2 to 100% flow meter 2 and 0% flow meter 1, within the interval between 20% (point A2) and 80% (point B1) of the reference measurement input. A linear interpolation is made to calculate the hybrid flow rate from flow meter 1 and flow meter 2 between the intermediate reference points A2-X1, X1-X2, X2-Xn, Xn-B1.

Figure 4:
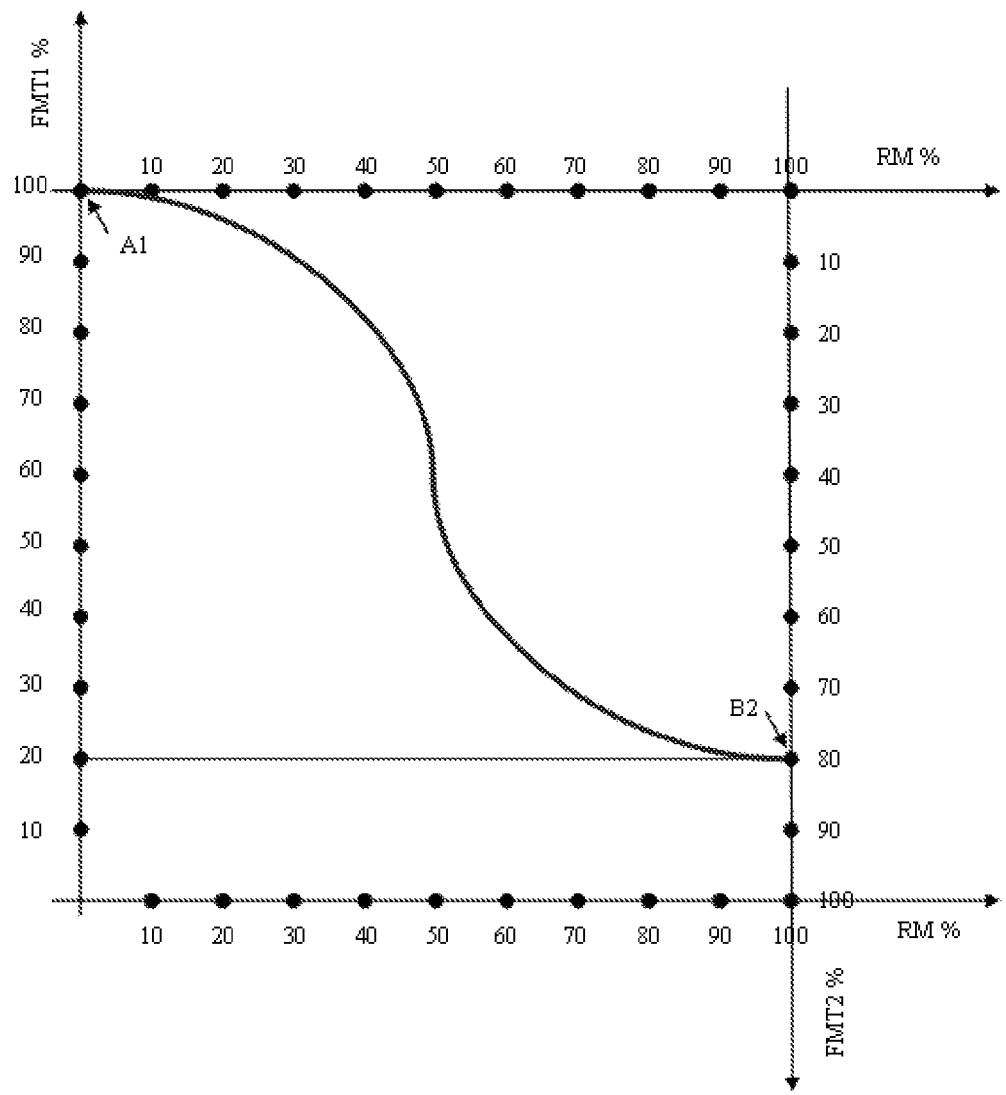

FIG. 4 shows an example of a non-linear transition from 100% of the flow rate from flow meter 1 and 0% of the flow rate from flow meter 2 to 80% of the flow rate from flow meter 2 and 20% of the flow rate from flow meter 1, within the interval between 0% (point A1=point A2) and 100% (point B2=point B1) of the reference measurement input based on a mathematical equation (smooth curve).

FIG. 5 shows an example wherein the hybrid value is calculated from velocity measurements and then converted in a hybrid flow rate. The transition is linear from 100% velocity meter 1 and 0% velocity meter 2 to 100% velocity meter 2 and 0% velocity meter 1, within the interval between 20% (point A2) and 60% (point B1) of the reference measurement input. The resulting hybrid velocity (V) is then multiplied by the wet cross-sectional area (A) according to the continuity equation Q=A*V in order to calculate the hybrid flow rate (Q).

As aforementioned, the technologies involved in the present invention can measure the level of fluid and the calculated hybrid value can be the hybrid level. This value is used to calculate a cross-sectional wet area (A). The velocity of the fluid is measured with an additional measuring technology and converted to an average velocity of the cross-sectional wet area (A). In order to calculate the hybrid flow rate (Q), the calculated cross-sectional wet area (A) is multiplied by the measured velocity (V) or the calculated average velocity (V) according to the continuity equation Q=A*V.

The technologies involved in the present invention can also measure the level/velocity combination of the fluid. The resulting hybrid level is used to calculate a cross-sectional wet area (A) and multiplied by the hybrid velocity (V) according to the continuity equation Q=A*V in order to calculate the hybrid flow rate (Q).

ADVANTAGES OF THE INVENTION

Instead of switching from one technology to the other at the crossover point from the reference technology, this invention allows a smooth, smart, progressive transition from one technology to the other in a linear or non-linear way, avoiding jumps in the flow result at the crossover point.

This technology also allows to incorporate into the hybrid flow rate calculation, the maximum information from each technology when the technology is best performing and the minimum information from each technology when the technology gets close to its limits, improving the hybrid flow rate measurement and its accuracy.

The invention claimed is:

1. Method to measure a hybrid flow rate of a liquid using simultaneously at least two measuring technologies and a reference measurement, said method comprising a step of calculation of a hybrid value, wherein the measurements of the at least two measuring technologies are combined according to a given rule to get said hybrid value by performing a linear or non-linear interpolation within a given interval of the reference measurement;
   wherein a contribution of each of the at least two measuring technologies to the hybrid value varies over the given interval of the reference measurement;
   wherein the reference measurement is a measurement performed by an additional measuring technology;
   wherein the additional measuring technology measures a different physical parameter than the at least two measuring technologies.

2. Method according to claim 1, wherein the reference measurement is a flow rate, a point velocity, an average velocity, a level, a differential pressure, a pH, a conductivity, a temperature or a turbidity of the liquid.

3. Method according to claim 1, wherein the measuring technologies measure a flow rate and wherein the hybrid value is the hybrid flow rate of the liquid.

4. Method according to claim 1, wherein the measuring technologies measure a velocity of the liquid and wherein the hybrid value is a hybrid velocity of the liquid.

5. Method according to claim 1, wherein the measuring technologies measure a level of the liquid and wherein the hybrid value is a hybrid level of the liquid.

6. Method according to claim 1, wherein the measuring technologies measure a level and a velocity of the liquid and wherein the hybrid value is made up of two values which are a hybrid level of the liquid and a hybrid velocity of the liquid.

7. Method according to claim 4, wherein the hybrid velocity (V) of the liquid is multiplied by a cross-sectional wet area (A) according to the continuity equation Q=A*V to obtain the hybrid flow rate (Q).

8. Method according to claim 5, wherein the hybrid level of the liquid is used to calculate a cross-sectional wet area (A), said area being multiplied by a measured velocity (V) or a calculated average velocity (V) according to the continuity equation Q=A*V to obtain the hybrid flow rate (Q), said measured velocity being measured with an additional measuring technology and converted to the average velocity (V) of the cross-sectional wet area (A).

9. Method according to claim 6, wherein the hybrid level of the liquid is used to calculate a cross-sectional wet area (A), said area being multiplied by the hybrid velocity (V) according to the continuity equation Q=A*V to obtain the hybrid flow rate (Q).

10. Method according to claim 1, wherein the interval comprises a lower endpoint and an upper endpoint.

11. Method according to claim 1, wherein the interval comprises a lower endpoint, an upper endpoint and intermediate points between endpoints.

12. Method according to claim 10, wherein the interpolation is performed between the endpoints of the interval.

13. Method according to claim 11, wherein the interpolation is performed between the lower endpoint, the intermediate points and the upper endpoint.

14. Method according to claim 1, wherein the non-linear interpolation is based on a mathematical equation.

15. Method according to claim 1, wherein the measuring technologies measure a flow rate and wherein the additional measuring technology measures a level.

16. Method according to claim 1, wherein the measuring technologies measure a velocity and wherein the additional measuring technology measures a level.

* * * * *